March 10, 1953 — G. E. BEARDSLEY, JR — 2,631,024
CARBURETOR HAVING A DENSITY RESPONSIVE FUEL CONTROL
Filed Feb. 13, 1948
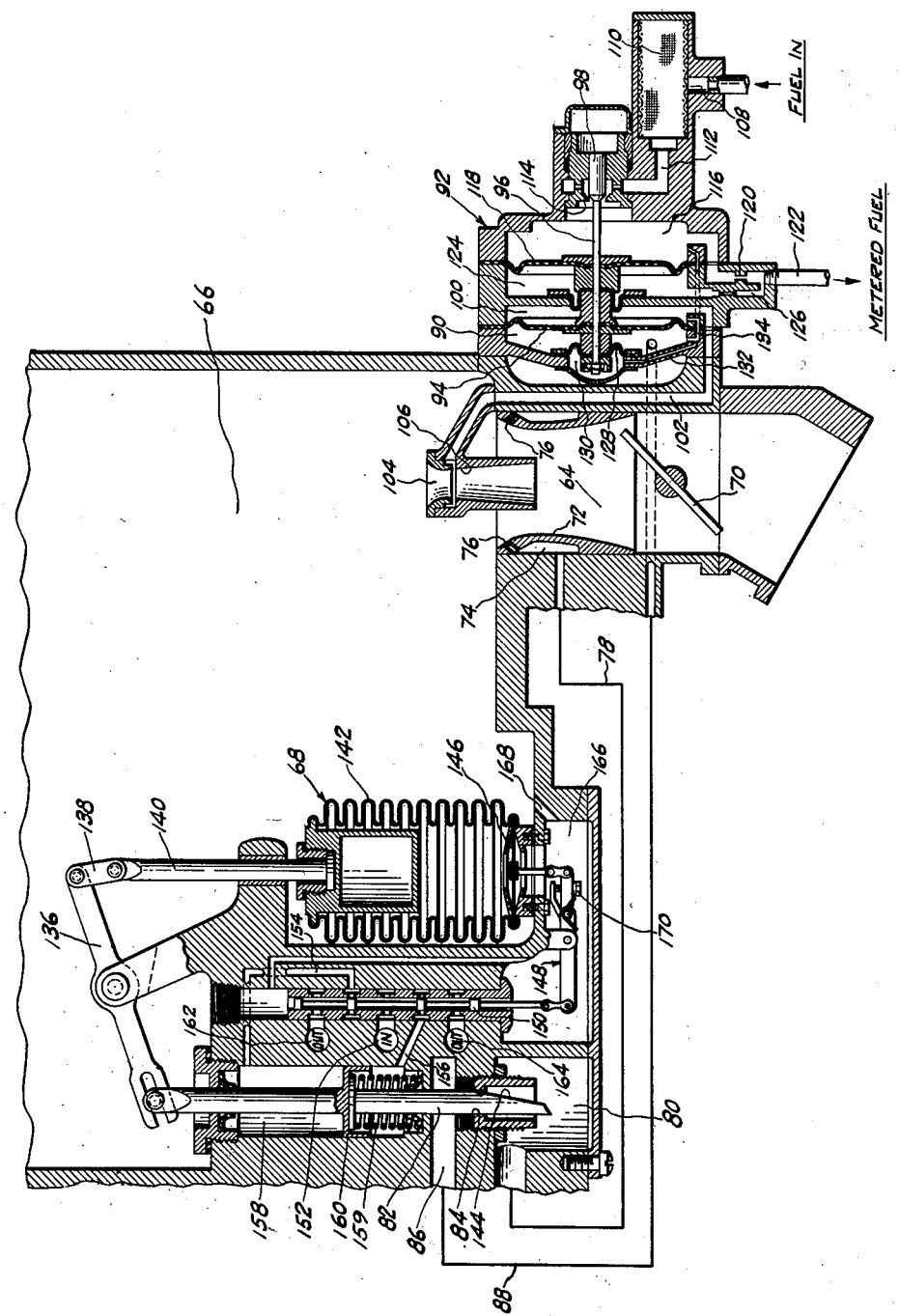
INVENTOR
Guy E. Beardsley Jr.
BY
Charles Albreen
ATTORNEY Patented Mar. 10, 1953

2,631,024

UNITED STATES PATENT OFFICE 2,631,024

CARBURETOR HAVING A DENSITY RESPONSIVE FUEL CONTROL

Guy E. Beardsley, Jr., West Hartford, Conn., assignor to United Aircraft Corporation, East Hartford, Conn., a corporation of Delaware Application February 13, 1948, Serial No. 8,217

2 Claims. (Cl. 261—39)

1

This invention relates to a density sensing device by means of which the density of a medium may be accurately measured. This device may be combined with a control such as the fuel control for power plants.

The use of a sealed expanding chamber in measuring the pressure of the surrounding medium is well known. As such chambers are in the form of sealed bellows, the walls of the expansion chamber have a resiliency that prevents the gas within the chamber from reaching the same pressure as that of the surrounding medium except when the walls are at rest thereby giving an inaccurate indication of the pressure. The resiliency of the chamber walls also reduces the extent of change in the dimension of the bellows so that the change in the dimension for small changes in pressure is not large enough to be indicated by the device. A feature of this invention is a device for automatically changing the volume of the sealed chamber to maintain the gas pressure within the chamber the same as that of the surrounding medium.

It is well known that a fixed mass of gas when sealed in an expansible chamber will always occupy the same volume for a given density. If the chamber is so arranged and located that rapid transfer of heat between the enclosed gas and the surrounding atmosphere is obtained, the temperatures inside and outside the chamber are maintained alike. With such an arrangement a difference in density between the medium inside the chamber and the medium outside must be the result of a difference in pressure. If the chamber is caused to change size until there is no pressure differential between the media within and surrounding the chamber, the change in dimension can be used as a measure of the change in density of the medium surrounding the chamber. A feature of the invention is therefore a device for measuring the changes in density of a medium by measuring the changes in size of a sealed chamber resulting from changes in the pressure differential between the inside and the outside of the chamber.

Another feature is an arrangement for positively causing the change in dimension, as by a servo mechanism actuated by the pressure differential, and for causing this servo simultaneously to adjust a control as a function of the change in density.

If the bellows or other expanding chamber is used alone to actuate a control, as, for example, the fuel control for a power plant, the resistance of the control to movement applies a load

2 on the bellows and causes an error in the density indication. The force available from the bellows, especially in small density changes, is frequently such that the control cannot be moved directly as a result of the change in density. A feature of the invention is a positive means for adjusting the size of the chamber until the internal and surrounding densities are the same, this positive means producing enough power to actuate the associated control.

Another feature is the use of this device as a means for adjusting a control mechanism such as the fuel control for an aircraft power plant, thereby adjusting the fuel as a direct function of the density of the medium in which the aircraft power plant is operating.

Other objects and advantages will be apparent from the specification and claims, and from the accompanying drawing which illustrates an embodiment of the invention.

The figure shows a fuel control for a carburetor with the density indicator associated therewith.

With reference to the single figure, the density responsive device is shown as a device for automatically controlling the fuel to a carburetor as a function of the density of the air entering the carburetor. As shown, the induction passage 64 for the carburetor communicates at its inlet end with a chamber 66 in which the density responsive device 68 is located. A throttle 70 may control the flow of air through the induction passage. The induction passage has a large venturi 72 which has a surrounding annular chamber 74 communicating with the air inlet through passage 76. A conduit 78 extends from the chamber 74 to a chamber 80, the outlet of which is controlled by a valve 82 forming a part of the density responsive device, as will hereinafter appear. The bore 84 in which the valve 82 is located communicates with another chamber 86 connected by a conduit 88 to a chamber 90 forming a part of the fuel control unit 92 for the carburetor. One wall of the chamber 90 is a diaphragm 94 which is connected to the valve stem 96 of the fuel control unit. The valve stem has associated therewith a valve 98 for controlling the rate of fuel flow through the unit.

On the side of the diaphragm 94 opposite to the chamber 90 is another chamber 100 which communicates through a passage 102 with an opening 104 at the throat of a small venturi 106 located within the large venturi 72, thereby applying to the diaphragm 94 the pressure differential between the pressure in passage 76 and the pressure at the opening 104.

Fuel enters the fuel control unit through a passage 108 where it may be filtered as by a filter 110 and passes through a channel 112 to the valve 98. This valve may engage a seat 114, and fuel passing this valve enters a chamber 116 on one side of a diaphragm 118 also connected to the stem 96. From the chamber 116 metered fuel is delivered past a restriction 120 to a conduit 122. On the other side of the diaphragm 118 is a chamber 124 which is connected as by a bypass channel 126 to the metered fuel passage on the downstream side of the restriction 120. An additional small diaphragm 128 may also be attached to the valve stem 96, and the chamber 130 formed by this diaphragm may communicate through a small bypass 132 with the chamber 116. It may be noted that chambers 98 and 100 are also connected by a restricted bypass 134.

With the arrangement above described, the fuel quantity is adjusted as a function of the change in the differential between the pressure at the opening 76 and the pressure at the opening 104. In adapting the device for controlling the fuel flow as a function of the density, the valve 82 is connected as by a lever 136 and a link 138 to a rod 140 extending from the free end of a sealed bellows 142 which, as above stated, is located within the chamber 66. As the density varies in the chamber 66, the bellows 142 will expand or contract and thereby change the position of the valve 82. It may be noted that the valve, which is in the form of a plunger, has a tapered end 144 by which to adjust the rate of flow past the valve as a function of its position endwise with respect to the end of the bore 84.

Sealed bellows 142 has one end, the lower end here, fixed to the wall of chamber 66. The movable end of the bellows, as has been stated above, is connected through suitable linkage to valve 82 for transmitting motion of the movable end to the valve. The end of the bellows which is fixed to the wall of chamber 66 has diaphragm 146 closing the opening in the bellows, one side of the diaphragm forming one wall of the chamber within the bellows. The other side of the diaphragm is exposed to a suitable pressure, here the pressure within chamber 66. When a change in the pressure in chamber 66 occurs, movement of the diaphragm results. This movement is transmitted through suitable linkage, to be described below, to actuate a servo-mechanism which in turn causes movement of the free end of the bellows until the pressure within the bellows is exactly the same as the pressure surrounding it. In this way a relatively large movement of the bellows takes place for each change in pressure and a more accurate indication of the actual pressure of the surrounding medium results since the resiliency of the walls of the bellows or any other resistance of the bellows to a change in dimension is eliminated.

The bellows is constructed to transfer heat rapidly between the media inside and outside the bellows so that temperature changes of the medium within the bellows may closely follow temperature changes of the medium outside the bellows. Since a fixed mass of gas will always occupy the same volume for a given density, and since the temperatures are maintained the same inside and outside the bellows, any differences in density must be a result of a difference in pressure. Thus, any changes in dimension resulting from pressure changes are also directly related to density changes.

In order that the adjustment of the valve 82 may be made directly as a function of the change in density, a servo-mechanism is provided for actuating the valve and at the same time adjusting the size of the bellows. Diaphragm 146 is connected through a linkage 148 to a valve 150 which ultimately connects a fuel inlet passage 152 to passages 154 and 156 respectively, leading to the opposite ends of a cylinder 158 in which a piston 160 on the valve 82 is slideable. When the valve 150 connects either passage 154 or 156 to the fuel inlet, the opposite passage is simultaneously connected to vent channels 162 or 164. The outer side of the diaphragm 146 communicates with a chamber 166, communicating as by a passage 168 with the chamber 66.

As the density of the air in the chamber 66 decreases the diaphragm 146 is forced down, thereby moving the valve 150 up to cause fuel to flow into the upper end of the cylinder 158 and move the valve 82 down to decrease the flow area past the valve 82. The piston 160 in cylinder 158 acts as a hydraulic motor to cause upward movement of the free end of the bellows until the pressure of the air within the bellows is exactly the same as that in the chamber 66. Similarly, an increase in the pressure of the air in chamber 66 causes upward movement of the diaphragm with corresponding upward movement of the valve 82 and downward movement of the free end of the sealed bellows. The linkage 148 may include an adjustment 170. A spring 159 acting on piston 160 will cause the valve 150 to move to open position in case of failure of the device.

By controlling the rate of flow past the valve 82, it is possible to control the pressure differential on opposite sides of the diaphragm 94, thereby adjusting or metering the fuel in response to density changes in the chamber 66.

It is to be understood that the invention is not limited to the specific embodiment herein illustrated and described, but may be used in other ways without departure from its spirit as defined by the following claims.

I claim:

1. In a device of the class described, a carburetor having a fuel control, a venturi, and density responsive means for sensing the density of air entering the carburetor and comprising: a sealed expansible chamber exposed to the air upstream of the venturi, the chamber having one end fixed and being constructed to transfer heat rapidly so that temperature changes of the gas within the chamber closely follow temperature changes of the air surrounding the chamber, a diaphragm closing one end of the chamber, reversible motor means actuated by movement of the diaphragm, means controlled by the reversible motor means for moving the free end of the expansible chamber to change the volume of the expansible chamber and render the pressure of the gas within the chamber the same as the pressure of the air surrounding the chamber, and valve means controlled by movement of the free end of the expansible chamber for regulating the flow of fuel through the fuel control as a function of the density of the air passing through the carburetor.

2. In a device of the class described, a carburetor having a fuel control, a venturi, and density responsive means for sensing the density of air entering the carburetor and comprising: a sealed expansible chamber exposed to the air upstream of the venturi, the chamber having one end fixed and being constructed to transfer heat rapidly so that temperature changes of the gas within the chamber closely follow temperature changes of the air surrounding the chamber, a diaphragm closing one end of the chamber, a servomotor actuated by movement of the diaphragm, means controlled by the servomotor for moving the free end of the expansible chamber to change the volume of the expansible chamber and render the pressure of the gas within the chamber the same as the pressure of the air surrounding the chamber, and valve means controlled by movement of the free end of the expansible chamber for regulating the flow of fuel through the fuel control as a function of the density of the air passing through the carburetor.

GUY E. BEARDSLEY, Jr.

REFERENCES CITED

The following references are of record in the file of this patent:

UNITED STATES PATENTS

| Number | Name | Date |
|---|---|---|
| 2,001,865 | Brandl | May 21, 1935 |
| 2,035,039 | Adams et al. | Mar. 24, 1936 |
| 2,123,038 | Dallmann | July 5, 1938 |
| 2,185,578 | Beardsley et al. | Jan. 2, 1940 |
| 2,307,838 | Jacobson | Jan. 12, 1943 |
| 2,332,716 | Hess | Oct. 26, 1943 |
| 2,382,941 | Moore | Aug. 14, 1945 |
| 2,393,144 | Chandler | Jan. 15, 1946 |
| 2,411,287 | Mock | Nov. 19, 1946 |
| 2,411,747 | Nelson | Nov. 26, 1946 |
| 2,411,748 | Kelley | Nov. 26, 1946 |

FOREIGN PATENTS

| Number | Country | Date |
|---|---|---|
| 229,452 | Switzerland | Feb. 1, 1944 |